United States Patent [19]

Divoux et al.

[11] Patent Number: 4,492,509

[45] Date of Patent: Jan. 8, 1985

[54] OBJECT-CONVEYING BOX, AND OBJECT-SORTING MACHINE EQUIPPED WITH SUCH BOXES

[75] Inventors: Michel Divoux; Hubert Bonanséa; Bernard Constant, all of Paris, France

[73] Assignee: Hotchkiss-Brandt Sogeme H.B.S., Paris, France

[21] Appl. No.: 257,653

[22] Filed: Apr. 27, 1981

[30] Foreign Application Priority Data

Apr. 29, 1980 [FR] France ................................ 80 09622

[51] Int. Cl.3 ................................................ B65G 17/36

[52] U.S. Cl. ..................................... 414/387; 414/378; 198/704; 198/796; 198/635; 104/247; 105/241.2

[58] Field of Search ............... 414/387, 378, 657, 414; 198/704, 796, 483, 635; 220/335, 260, 262; 105/280, 241.2, 241 C, 253; 104/245, 247

[56] References Cited

U.S. PATENT DOCUMENTS

| | | | |
|---|---|---|---|
| 20,666 | 4/1913 | Hansen | 414/387 |
| 892,119 | 6/1908 | Bissen | 414/657 |
| 1,412,869 | 4/1922 | Holstein | 414/387 |
| 1,900,914 | 3/1933 | Lornet | 104/245 |
| 3,306,675 | 2/1967 | Fritz | 105/280 |
| 3,710,524 | 1/1973 | Seiz | 104/247 |
| 4,171,739 | 10/1979 | Yamoto | 198/704 |

FOREIGN PATENT DOCUMENTS

| | | | |
|---|---|---|---|
| 120495 | 5/1901 | Fed. Rep. of Germany | 414/387 |
| 1004550 | 3/1957 | Fed. Rep. of Germany | 414/387 |
| 1228087 | 11/1966 | Fed. Rep. of Germany . | |
| 1136552 | 12/1956 | France . | |
| 314580 | 7/1929 | United Kingdom . | |
| 693365 | 7/1953 | United Kingdom . | |
| 831682 | 3/1960 | United Kingdom . | |

*Primary Examiner*—Bruce H. Stoner, Jr.
*Assistant Examiner*—James E. Barlow
*Attorney, Agent, or Firm*—Oblon, Fisher, Spivak, McClelland & Maier

[57] ABSTRACT

A box formed by a set of walls closed by a pivoting bottom which is openable so that the object which it carries falls vertically in the ejection zone to be collected in a receptacle. The walls are extended below the bottom so that the pivoting operation may be started before the box quite reaches the ejection zone. The bottom in the closed position forms an angle with the horizontal, thus the object which it carries is automatically jolted against the rear wall during the conveying phase. The portion of the rear wall above the rest position of the bottom is given a slight forward inclination to promote the sliding of the object towards the discharge position. A comb-shaped separation scrapes the bottom (indented) so as to loosen any object adhering abnormally thereto.

13 Claims, 4 Drawing Figures

OBJECT-CONVEYING BOX, AND OBJECT-SORTING MACHINE EQUIPPED WITH SUCH BOXES

BACKGROUND OF THE INVENTION

The invention relates to a box for conveying objects. It relates also to any machine for sorting objects equipped with such boxes.

Machines for sorting objects must have a very high performance—namely: very high sorting speed, a low rate of error and a large number of possible directions. It is then necessary to have conveyor boxes particularly adapted to such an application.

In the known high-rate object-sorting system, the discharge of the objects from the conveyor generally takes place laterally in a direction perpendicular to the conveying axis. Therefore, so as to limit sorting errors, it is necessary to increase the pitch between discharges. It follows then that reliability is obtained to the detriment of compactness.

SUMMARY OF THE INVENTION

The present invention aims at ameliorating or overcoming these disadvantages. It relates to a conveying box capable of receiving objects of varying weight and size and conveying them from a so-called loading station to a so-called ejection station, where the object is ejected from its box by the bottom of the box pivoting in a direction perpendicular to the conveying direction. In this manner, the objects are collected in receptacle as function of a predetermined addresses. This result is obtained by a combination of means occupying a minimum space.

The present invention relates more precisely to a box for conveying objects from a loading zone to an ejection zone comprising a set of walls defining a frame closed by a bottom on which the object to be conveyed is deposited, characterized in that this bottom is equipped with means for tilting it when it reaches the ejection zone, in which zone the object must be removed from the box, said tilting being such that the object falls vertically into a receptacle intended to receive it.

DESCRIPTION OF THE DRAWINGS

The invention will be better understood from the following explanation and the accompanying figures in which.

For the sake of clarity, the same elements bear the same references in all the figures.

DESCRIPTION OF THE PREFERRED EMBODIMENT

Figure 1:
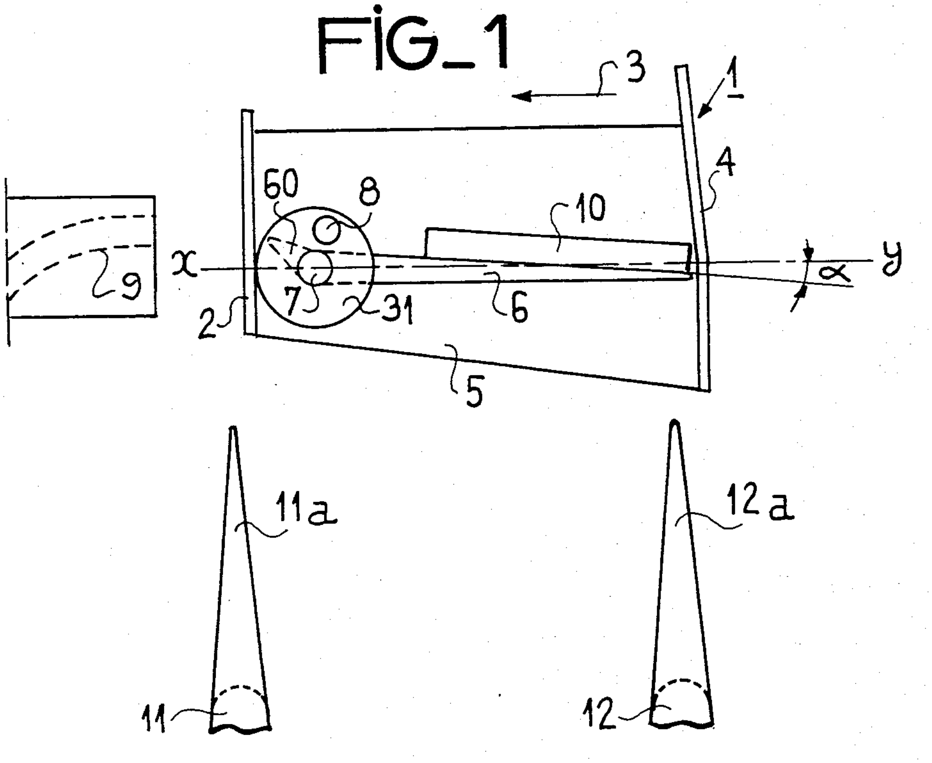
FIGS. 1 and 2 are explanatory diagrams.
Figure 2:
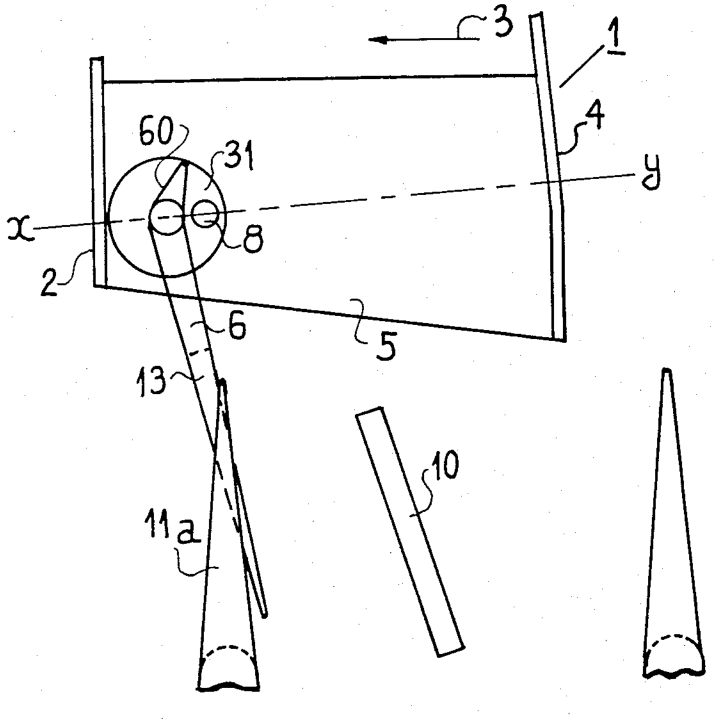

As can be seen in FIGS. 1 and 2, a conveyor box 1 in accordance with the invention comprises four walls called respectively front wall 2 (with reference to the traveling direction shown by arrow 3), rear wall 4 and two parallel lateral walls such as 5 which with bottom 6 define box 1. The bottom 6 may pivot about a point shaft 7 during movement of the box. The pivot shaft 7 pivots about two bearings carried by the side partitions (side walls 5). The pivot shaft 7 carries a trunnion 31. A stud 8 integral with the trunnion 31 cooperates with a cam 9 whose camming path it follows to rotate bottom 6 and ensure the pivoting of this latter and the ejection of the object which it carries by gravity effect in a direction perpendicular to the direction of movement of the box. FIG. 1 shows box 1 in the conveying position, with the bottom closed, carrying an object 10 to be conveyed.

FIG. 2 shows box 1 and with bottom 6 open, object 10 falling and being directed towards a receptacle (not shown in the figure).

The positioning of the pivot shaft 7 as close as possible to the front wall 2 of box 1 provides the largest possible opening when the bottom 6 is entirely pivoted. Furthermore, since (for reasons which will be explained further on) the object 10 rests against the rear wall 4 during travel of the object 10, the positioning of the pivot shaft 7 as close as possible to the front wall 2 also ensures that the object 10 will begin to slide off the bottom 6 at the earliest possible time.

The upper surface of bottom 6 is slightly inclined by an angle $\alpha$ with respect to the horizontal xy during the conveying phase so as to promote jolting of the objects 10 against the rear wall 4 of box 1 thus facilitating their release when leaving the box. Finally the portion of the rear wall 4 above the rest position of the bottom 6 may be given a slight forward inclination to limit any possible braking of the objects against the rear wall 4 when the bottom 6 is caused to move.

Separations such as 11 and 12 separate from each other the ejection zones where the receptacles are located. These separations 11, 12, in the form of a comb, comprise a plurality of teeth such as 11*a* and 12*a* whose function is to rake the objects 10 which might remain stuck to the pivoting bottom 6. The bottom 6 contains a plurality of longitudinal apertures 13, in fact as many apertures 13 as teeth 11*a*, 12*a*. The apertures 13 are orientated so that the separations 11, 12 etc. do not hinder the free advancing movement of the boxes 1 but on the contrary ensure efficient combing of these bottoms 6 when they are open, thus dislodging any object 10 which might adhere abnormally to the bottoms 6.

Figure 3:
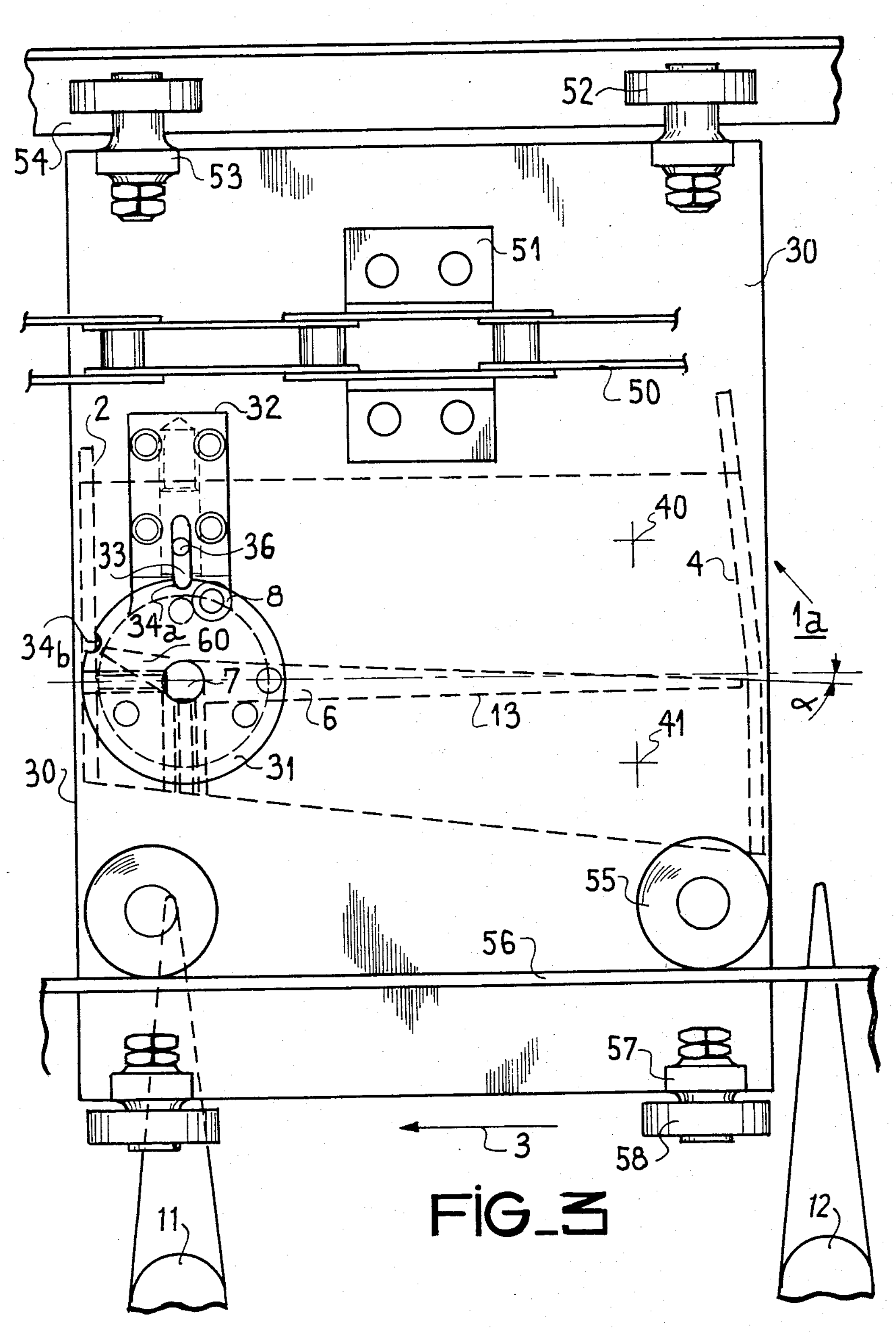
FIGS. 3 and 4 show one embodiment of a box in accordance with the invention and particularly the equipment for guiding and driving the box, respectively in the closed position and in the open position.
Figure 4:
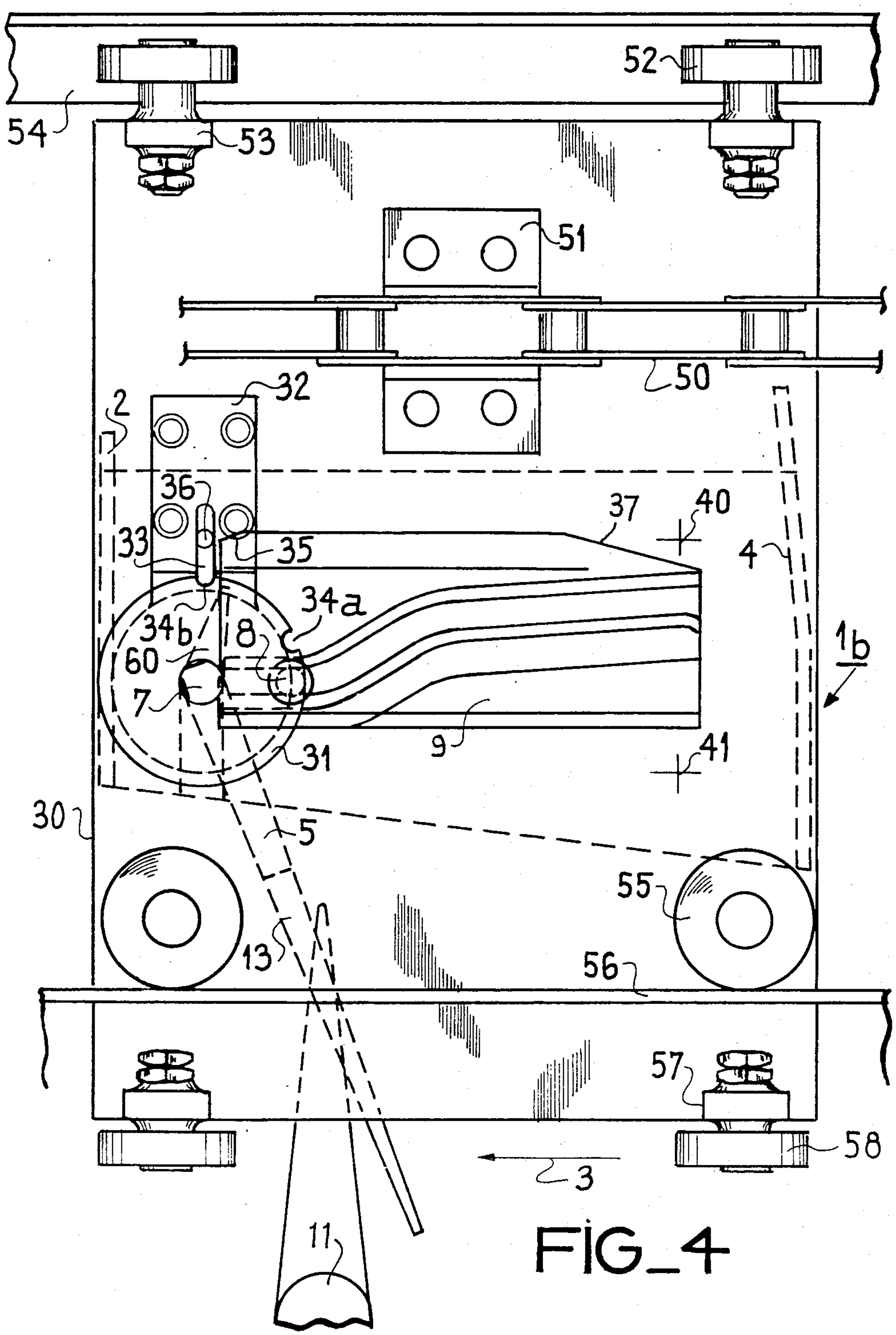

FIGS. 3 and 4 show, seen from the side, one embodiment of boxes in accordance with the invention equipped with their guide and drive means, the assembly of these boxes and these means forming a succession of tip-trucks movable over a roundabout path whose layout may be as varied as required by the application concerned.

In FIGS. 3 and 4 which are described simultaneously and which are in fact the extension of each other, two boxes are shown which move in the direction shown by arrow 3. Box 1*a* has its bottom 6 closed, in the conveying position, and box 1*b* of FIG. 4 has its bottom 6 open, in the ejection position.

The two boxes are formed by four walls as was explained above, particularly a so-called front wall 2 (considering the traveling direction of the boxes shown by arrow 3), a rear wall 4 having the profile defined in the preceding figures, and two lateral walls 5 extending parallel to the conveying direction which define with the other two walls and the pivoting bottom 6 the free volume of the box. These boxes are interlocked (by any means 40, 41) with the frame 30 of the corresponding tip-truck. We find again on these figures the principal feature already mentioned of the pivoting bottom 6, namely in particular the slope by an angle $\alpha$ with respect to the horizontal of the upper surface of the bottom 6, which sloping promotes jolting of the conveyed objects against the rear wall 4.

With the same purpose in mind, the profile of this bottom 6 comprises a more sloping profile 60 the function of which is also to promote said jolting of the object.

The walls 2, 4, 5 of the box extend below the pivoting bottom 6. Therefore, its opening may be controlled before the box is positioned at right angles to the chosen discharge position. The result is a possible anticipated speeding up of the object which reduces the transfer time thereof. A trunnion 31 is integral with the bottom 6 whose pivoting shaft is referenced 7. According to one embodiment (which is in no way limiting) a stud 8 is integral with the trunion 31. During movement of the box, when the box is about to enter its ejection zone, the stud 8 engages in the groove of a cam 9 the profile of which it will follow. Movement of the stud 8 rotates trunnion 31, which in turn rotates the pivoting shaft 7 of bottom 6. The bottom 6 accordingly pivots, thus releasing its load downwards (in a direction perpendicular to the traveling direction of the box). Cam 9 is fixed with respect to the movement of the tip-trucks, but it may occupy two positions: one called operational, the other called at rest. When the box reaches the zone corresponding to the predetermined address of the object which it contains, cam 9 under the action for example of an electromagnet is placed in the operational position. Stud 8 engages in the groove of cam 9. If the object on the other hand is to travel further, cam 9 remains in the rest position and the box passes without anything happening.

So that loading of the object to be conveyed under the effect of a greater impetus does not trigger off the opening movement of the bottom, locking means may be provided. Such locking means for example, be a ratchet mechanism such as shown at 32, integral with the box. This system comprises a retractable finger 33 capable of penetrating in a low position into a notch provided in trunnion 31. Two notches are provided: a first deep notch **34*a* in which finger 33 engages so as to prevent any undesired movement of the trunnion during the loading and conveying phase and a second shallower notch 34*b* in which finger 33 engages to maintain the trunnion in position with the bottom open. The finger 33 may be retracted by means of a small force, and retraction of the finger 33 and releases the trunnion 31. Consequently, in the conveying position bottom 6 is locked by the positioning of the finger 33 in the first notch 34*a*. As soon as the box reaches the position of cam 9, if this latter is placed in the operational position, a first external cam surface 35 provided for this purpose on the cam 9 forces a cam follower 36 integral with the finger 33 upwardly thereby disengaging finger 33 from the first notch 34*a*. At the end of the pivoting movement of bottom 6, a second external cam surface 37 on the cam 9 permits the cam follower 36 to move downwardly under the force of gravity, thereby allowing the finger 33 to penetrate into second notch 34*b***.

We find again in these figures the partitions 11 and 12 in the form of a comb whose fingers loosen objects which might adhere to bottoms 6. The bottoms 6 are provided with apertures 13 for combing the bottoms in the pivoted position.

In the embodiment shown in FIGS. 3 and 4 described above, means are provided for supporting the load, for driving the tip-trucks, for guiding them, and for counterbalancing any pivoting moment. The drive means may for example be formed by a chain 50. Frame 30 is connected to this chain by means of a connecting link 51. The chain follows any path previously established depending on the application considered.

The guide means comprise guide rollers 52 fixed to the frame 30 by any fixing means 53 and sliding in a rail and counter-rail system 54. The means for supporting the load are formed for example by load-carrying rollers 55 running on a running track 56 which forms at the same time a rail cooperating with positioning rollers 58 fixed to frame 30 by any fixing means 57 so as to prevent the swinging movement of the tip-trucks.

A box in accordance with the invention may in particular be applied to an object-sorting machine, and the operation of the device is described below. In a loading zone each object is deposited by any means not forming part of the present invention into the box to which it is assigned. It is jolted in box 1 against rear wall 4 as was described above. That is to say that the sloping of the upper surface of the bottom 6 and the force of gravity cause the object to slide along the pivoting bottom 6 when the ejection procedure is started up. As soon as the box 1 containing the object reaches the ejection zone corresponding to the address of the object, the cooperation of cam 9 in the operational position with unlocking pawl 36 and stud 8 causes trunnion 31 to rotate, which results in the pivoting of bottom 6. The object slides along the bottom 6 and, when the bottom 6 is sufficiently open, the object falls vertically between two separations 11 and 12 (defining the ejection zone) into a receptacle, for example a sack (not shown in the figure).

A device in accordance with the invention presents numerous advantages. Particularly, when it is intended to transport thin objects of large size, the objects being laid flat in the box, they are transferred to the discharge positions in the direction of their smallest direction, so that the time required for the transfer of the object is limited.

Since the transfer takes place vertically from top to bottom, the effect of the force of gravity which provides the moving force thereof is maximum.

Moreover, considering the configuration of the box and particularly the fact that its lateral walls extend below the pivoting bottom, it is possible to begin the pivoting procedure before the box arrives in a position at right angles to the ejection zone corresponding to the address of the object which must be ejected. Finally, in the case where an adherence effect (mechanical, chemical, aerodynamic) exists between the object and the pivoting bottom when this latter is open, a positive action ensuring separation of the object from the bottom is achived by combing the tray by means of the teeth of the separations which are in the form of a comb.

The invention applies particularly to the sorting of objects such as photographic packets, postal objects (letters, packets . . . ).

What is claimed is:

1. Apparatus for conveying objects from a loading zone to an ejection zone, said apparatus comprising:

(a) a set of walls defining a frame;

(b) a bottom mounted at the front of said frame for pivotal movement about an axis such that, when said bottom is pivoted open by the force of gravity, an object being conveyed by the apparatus is permitted to fall vertically into a receptacle intended to receive it;

(c) a trunnion operatively connected to said bottom such that prevention of the pivotal motion of said trunnion prevents pivotal motion of said bottom, said trunnion being mounted for pivotal movement about the same axis as said bottom;

(d) a retractable finger which is mounted on one of said walls and which engages in a first notch provided in said trunnion during the loading and conveying phases, thereby preventing pivotal motion of said trunnion;

(e) a cam and cam follower arrangement which cams said retractable finger out of said first notch, thereby permitting said bottom to begin pivoting open due to the force of gravity, said cam and cam follower arrangement being positioned and said bottom being mounted on said walls sufficiently far above the lower edges of said walls so that said bottom does not pivot beneath said walls before the box formed by said set of walls and said bottom arrives at the ejection zone.

2. Apparatus as recited in claim 1 wherein said retractable finger engages in a second notch provided in said trunnion when said bottom is pivoted to its fully open position, thereby preventing pivotal motion of said trunnion until said retractable finger is disengaged from said second notch.

3. Apparatus as recited in claim 1 wherein said bottom pivots about an axis which is perpendicular to its direction of motion.

4. Apparatus as recited in claim 1 and further comprising first means for conveying the box formed by said set of walls and said bottom in a horizontal direction.

5. Apparatus as recited in claim 4 wherein said first means comprise a chain which drives said box along a given path from the loading zone to the ejection zone but which does not carry the weight of said box.

6. Apparatus as recited in claim 5 wherein said first means further comprises load-carrying rollers mounted on said walls which support the weight of said box and which run over a running path.

7. Apparatus as recited in claim 6 and further comprising guide rollers mounted on the upper and lower surfaces of said walls, said guide rollers cooperating with transversely spaced running surfaces to prevent any swinging movement of said box during loading and conveying.

8. Apparatus as recited in claim 1 wherein, during the conveying phase, the upper surface of said bottom forms an angle $\alpha$ with the horizontal such that an object which it carries is caused to slide against the rear wall due to the effect of gravity.

9. Apparatus as recited in claim 4 wherein, during the conveying phase, the upper surface of said bottom is slanted upwardly in the direction of motion, whereby an object supported by said bottom is slid against the rear wall by the force of gravity.

10. Apparatus as recited in claim 1 wherein said bottom is pivoted as closely as possible to the front wall, thereby providing the largest possible opening when said bottom is pivoted open.

11. Apparatus as recited in claim 1 wherein separations in the form of combs comprising a plurality of teeth are provided for separating the different ejection zones.

12. Apparatus as recited in claim 11 wherein said bottom contains a plurality of longitudinal apertures which cooperate with said teeth so that said teeth loosen the objects from said bottom if they adhere abnormally thereto.

13. Apparatus for conveying objects from a loading zone to an ejection zone, said apparatus comprising:

(a) a set of walls defining a frame;

(b) a bottom mounted at the front of said frame for pivotal movement about an axis which is perpendicular to its direction of motion such that, when said bottom is pivoted open by the force of gravity, an object being conveyed by the apparatus is permitted to fall vertically into a receptacle intended to receive it;

(c) a trunnion operatively connected to said bottom such that prevention of the pivotal motion of said trunnion prevents pivotal motion of said bottom, said trunnion being mounted for pivotal movement about the same axis as said bottom;

(d) a retractable finger which is mounted on one of said walls and which engages in a first notch provided in said trunnion during the loading and conveying phases, thereby preventing pivotal motion of said trunnion;

(e) a cam and cam follower arrangement which cams said retractable finger out of said first notch, thereby permitting said bottom to begin pivoting open due to the force of gravity, before said frame has arrived over the receptacle, wherein said walls are extended below said bottom by an amount sufficient so that said bottom does not pivot beneath said walls before the box formed by said set of walls and said bottom arrives at the ejection zone.

* * * * *